(12) United States Patent
Burns

(10) Patent No.: US 7,176,048 B1
(45) Date of Patent: Feb. 13, 2007

(54) OPTICALLY COUPLED SEALED-CAVITY RESONATOR AND PROCESS

(76) Inventor: David W. Burns, 15770 Rica Vista Way, San Jose, CA (US) 95127

( * ) Notice: Subject to any disclaimer, the term of this patent is extended or adjusted under 35 U.S.C. 154(b) by 262 days.

(21) Appl. No.: 10/905,036

(22) Filed: Dec. 12, 2004

(51) Int. Cl.
H01L 21/00 (2006.01)
(52) U.S. Cl. .................. 438/53; 438/57; 257/E31.001
(58) Field of Classification Search ............ 438/22–98, 438/510, 689–757, 761, 778
See application file for complete search history.

(56) References Cited

U.S. PATENT DOCUMENTS

| | | |
|---|---|---|
| 4,126,049 A | 11/1978 | Cotter |
| 4,137,511 A | 1/1979 | Jones |
| 4,372,173 A | 2/1983 | EerNise |
| 4,567,451 A | 1/1986 | Greenwood |
| 4,721,925 A | 1/1988 | Farace |
| 4,724,351 A | 2/1988 | EerNisse |
| 4,743,752 A | 5/1988 | Olsen |
| 4,744,863 A | 5/1988 | Guckel |
| 4,772,786 A | 9/1988 | Langdon |
| 4,831,304 A | 5/1989 | Dorey |
| 4,841,775 A | 6/1989 | Ikeda |
| 4,853,669 A | 8/1989 | Guckel |
| 4,884,450 A | 12/1989 | Greenwood |
| 4,897,360 A | 1/1990 | Guckel |
| 4,926,143 A | 5/1990 | Harada |
| 4,966,649 A | 10/1990 | Harada |
| 4,996,082 A | 2/1991 | Guckel |
| 5,009,108 A | 4/1991 | Harada |
| 5,060,526 A | 10/1991 | Barth |
| 5,089,695 A | 2/1992 | Willson |
| 5,090,254 A | 2/1992 | Guckel |
| 5,101,664 A | 4/1992 | Hockaday |
| 5,105,665 A | 4/1992 | Parsons |
| 5,165,289 A | 11/1992 | Tilmans |
| 5,188,983 A | 2/1993 | Guckel |
| 5,275,055 A | 1/1994 | Zook |
| 5,295,395 A | 3/1994 | Hocker |
| 5,338,929 A | 8/1994 | Douma |
| 5,417,115 A | 5/1995 | Burns |
| 5,442,963 A | 8/1995 | Largeau |
| 5,458,000 A | 10/1995 | Burns |
| 5,473,944 A | 12/1995 | Kurtz |
| 5,485,753 A | 1/1996 | Burns |
| 5,511,427 A | 4/1996 | Burns |
| 5,543,349 A | 8/1996 | Kurtz |
| 5,550,516 A | 8/1996 | Burns |
| 5,559,358 A | 9/1996 | Burns |
| 5,654,819 A | 8/1997 | Goossen |
| 5,683,594 A | 11/1997 | Hocker |
| 5,714,690 A | 2/1998 | Burns |
| 5,729,075 A | 3/1998 | Strain |
| 5,747,705 A | 5/1998 | Herb |
| 5,772,322 A | 6/1998 | Burns |

(Continued)

Primary Examiner—Savitri Mulpuri
(74) Attorney, Agent, or Firm—David W. Burns (57) ABSTRACT

A process to form a laterally offset photodiode for an optically coupled resonator includes implanting a semiconductor substrate to form the laterally offset photodiode adjacent to the resonator. The resonator masks the implanting underneath the resonator when the semiconductor substrate is implanted. Also disclosed is an optically coupled resonator, a process for fabricating an optically coupled resonator, and a device including an optically coupled resonator having a laterally offset photodiode.

15 Claims, 6 Drawing Sheets

U.S. PATENT DOCUMENTS

| | | | |
|---|---|---|---|
| 5,780,742 | A | 7/1998 | Burns |
| 5,808,210 | A | 9/1998 | Herb |
| 5,831,262 | A | 11/1998 | Greywall |
| 5,844,236 | A | 12/1998 | Wilson |
| 5,880,509 | A | 3/1999 | Watanabe |
| 5,969,257 | A | 10/1999 | De Bortoli |
| 6,006,607 | A | 12/1999 | Bryzek |
| 6,031,944 | A | 2/2000 | Youngner |
| 6,229,190 | B1 | 5/2001 | Bryzek |
| 6,246,638 | B1 | 6/2001 | Zook |
| 6,255,728 | B1 | 7/2001 | Nasiri |
| 6,346,742 | B1 | 2/2002 | Bryzek |
| 6,351,996 | B1 | 3/2002 | Nasiri |
| 6,487,913 | B2 | 12/2002 | Debesis |
| 6,557,419 | B1 | 5/2003 | Herb |
| 6,710,355 | B2 | 3/2004 | Youngner |
| 6,714,007 | B2 | 3/2004 | Youngner |
| 6,763,723 | B1 | 7/2004 | Zook |
| 6,894,787 | B2 | 5/2005 | Youngner |
| 6,966,228 | B2 | 11/2005 | Binet |
| 2004/0231409 | A1 | 11/2004 | Lelong-Feneyrou |
| 2004/0244502 | A1 | 12/2004 | Youngner |

OPTICALLY COUPLED SEALED-CAVITY RESONATOR AND PROCESS

FIELD OF THE INVENTION

This invention relates generally to semiconductor devices, and more specifically to optically coupled resonators for sensors, filters and oscillators.

BACKGROUND OF THE INVENTION

Resonant sensors are used in the precision pressure measurement field because of their high stability, high sensitivity and low-temperature coefficients. Resonant sensors can be constructed of primarily silicon-based materials using standard processes of the semiconductor industry including thin-film deposition, etching, doping and lithography. While resonant pressure sensors are generally more complex than piezoresistive pressure sensors, their stability and accuracy are less dependent on electronic signal processing circuitry than are comparable piezoresistive sensors and capacitive sensors. Currently available resonant sensors have resonators comprised of a single material such as quartz, single crystal silicon or deposited polysilicon films. Very high precision resonators have been made from well-cut quartz.

The vibrating micromechanical body or resonator of a resonant pressure sensor provides a frequency as output data, the frequency depending upon a stress such as pressure that modifies the natural resonant vibrational frequency of the resonator. A load applied to the sensor structure strains the resonator causing a resonant frequency shift of the resonator. The frequency output of the resonator provides a measure of the magnitude of the mechanical load applied to the sensor structure, and as a result, pressure can be measured as a consequence of the frequency shift. Currently available resonant pressure sensors interface with analog and/or digital electronics to measure pressure.

In a conventional piezoresistive pressure sensor, deformations of a silicon diaphragm with applied pressure cause shifts in a Wheatstone bridge fabricated from single-crystal piezoresistors in the diaphragm resulting in a voltage output indicating the amount of pressure applied to the sensor. The output voltage from the Wheatstone bridge requires an analog-to-digital (A/D) conversion to be used in digital systems. An example of a surface-micromachined absolute pressure sensor has a pressure diaphragm formed from a deposited thin film of polysilicon with an integral vacuum cavity reference directly under the diaphragm and dielectrically isolated polysilicon piezoresistors, as described in "Sealed cavity semiconductor pressure transducers and method of producing the same," U.S. Pat. No. 4,744,863, Guckel et al., issued May 17, 1988.

The widespread use and continuing trend toward digital information and control systems, together with the need for more accurate and higher-pressure instrumentation, have prompted the development of digital pressure transducers capable of precision measurements in pressure ranges up to about 250 MPa. One exemplary high-precision digital pressure sensor operates on the principle of changing the resonant frequency of load-sensitive quartz crystals with pressure-induced stress. Frequency signals from the quartz crystals are counted and linearized through microprocessor-based electronics to provide two-way communication and control in digital formats. The aforementioned quartz crystal pressure transducers have a resolution as good as a few parts per billion and have been used to determine the performance of high precision, primary standard dead-weight testers.

One example of a surface-micromachined resonant sensor has a resonant strain gage formed from a deposited thin film of polysilicon with an integral vacuum cavity surrounding the resonator. Several patents providing background to such resonant sensors include "Dielectrically isolated resonant microsensors," U.S. Pat. No. 5,417,115, Burns, issued May 23, 1995; "Static pressure compensation of resonant integrated microbeam sensors," U.S. Pat. No. 5,458,000, Burns et al., issued Oct. 17, 1995; "Cantilevered microbeam temperature sensor;" U.S. Pat. No. 5,511,427, Burns, issued Apr. 30, 1996; "Method for making a thin film resonant microbeam absolute;" U.S. Pat. No. 5,747,705 Herb et al., issued May 5, 1998; and "Thin film resonant microbeam absolute pressure sensor," U.S. Pat. No. 5,808,210 Herb et al., issued Sep. 15, 1998.

Another example of a resonant pressure sensor, which is fabricated from single-crystal silicon, is disclosed in "Semiconductor pressure sensor and its manufacturing method," Watanabe et al., U.S. Pat. No. 5,880,509 issued Mar. 9, 1999. The sensor comprises a single-crystal silicon substrate, a closed air-gap chamber, a measured diaphragm made by epitaxial growth, and a strain detection element incorporated in the measuring diaphragm.

The operation of a resonant pressure sensor requires a resonator to be excited into vibrational motion and detection of this motion. Forces and moments are applied that bend, twist, elongate or contract the resonator. Various methods for excitation and detection of resonant sensors have been proposed including thermal excitation with piezoresistive detection; electrostatic excitation with capacitive detection; Lorentz force excitation with magnetic flux detection; piezoelectric excitation with piezoelectric detection, and optical excitation with optical detection. In an exemplary method, resonant microbeams are driven and sensed by a single multimode optical fiber using a strain-sensitive oscillator, as described in "Fiber-optic vibration sensor based on frequency modulation of light-excited oscillators," U.S. Pat. No. 6,246,638, Zook et al., issued Jun. 12, 2001. A suggested method for driving and sensing a resonant sensor by using modulated and unmodulated light from multiple light sources is described in "Multi-wavelength optical drive/sense readout for resonant microstructures," U.S. Pat. No. 5,844,236, Wilson, issued Dec. 1, 1998. A photodetector detects the filtered reflected light to determine the resonant frequency of the resonator.

Resonators may be hermetically sealed in an evacuated cavity or enclosure to provide separation from the surrounding environment, eliminating effects such as air damping of the resonator and mass loading on the resonator body.

Micro-electrical-mechanical systems (MEMS) researchers are working on producing precision resonant pressure sensors having increased noise immunity, intrinsic safety, and long line-driving capability. It is desirable that a pressure sensor can operate in the harsh conditions associated with, for example, turbine engines, high-speed combustors, and other aerospace and industrial applications.

Because of limitations in the use of electrically powered/electrical output sensors in high-noise environments, hazardous areas, and some medical applications, it is advantageous to combine the precision of resonator-based sensors with the total optical isolation of fiber-optic technology. One method of optically powering a resonant low-pressure sensor is described in "Optically powered resonant integrated microstructure pressure sensor," Youngner, U.S. Pat. No. 6,710,355, issued Mar. 23, 2004.

In the pressure-sensor industry and other sensor application areas, the need exists for precise and stable sensors having low hysteresis, remote access, electromagnetic interference (EMI) immunity, and increased safety in harsh, volatile, or explosive environments with the elimination of voltage and electronic circuitry at the sensor element. Additional features that are desirable for resonant sensors include a simplified fabrication process, integral vacuum sealing, reduction or elimination of stiction and snap-down or pull-in problems associated with the resonator, accurate positioning of the drive and sense electrodes, alignment of the phase between the drive frequency and resonator movement over a wide frequency range, high signal-to-noise ratio of the detected signal, simplification of the optical interface to the resonator, and the opportunity for relatively easy integration of the sensor with more complex fabrication processes such as complementary metal-oxide-semiconductor (CMOS) and bipolar complementary metal-oxide-semiconductor (BiCMOS) processes.

SUMMARY OF THE INVENTION

One aspect of the invention is a process for fabricating an optically coupled resonator. A semiconductor substrate is provided. A lower sacrificial layer is formed on the semiconductor substrate. A structural layer is formed on the lower sacrificial layer. The structural layer is patterned and etched to from a resonator body having a resonator sidewall and a resonator upper surface. An upper sacrificial layer is formed on at least the resonator sidewall and the resonator upper surface. The semiconductor substrate is doped to form a laterally offset photodiode. A portion of the semiconductor substrate near the resonator body is exposed. A resonator shell is formed around the resonator body. A portion or more of the lower sacrificial layer and the upper sacrificial layer are etched to from a resonator cavity around the resonator body. A sealing layer is applied to seal the resonator cavity.

Another aspect of the invention is a process to form a laterally offset photodiode for an optically coupled resonator. A semiconductor substrate is implanted to form the laterally offset photodiode adjacent to the resonator. The resonator masks the implanting underneath the resonator when the semiconductor substrate is implanted.

Another aspect of the invention is an optically coupled resonator including a laterally offset photodiode adjacent to the resonator.

Another aspect of the invention is a device including an optically coupled resonator. A laterally offset photodiode is adjacent to the resonator. The resonator is driven by an electric field generated between the laterally offset photodiode and the resonator when incident light strikes the photodiode.

Other aspects, features and attendant advantages of the present invention will become more apparent and readily appreciated by the detailed description given below in conjunction with the accompanying drawings. The drawings should not be taken to limit the invention to the specific embodiments, but are for explanation and understanding and are not necessarily drawn to scale. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE INVENTION

Figure 1:
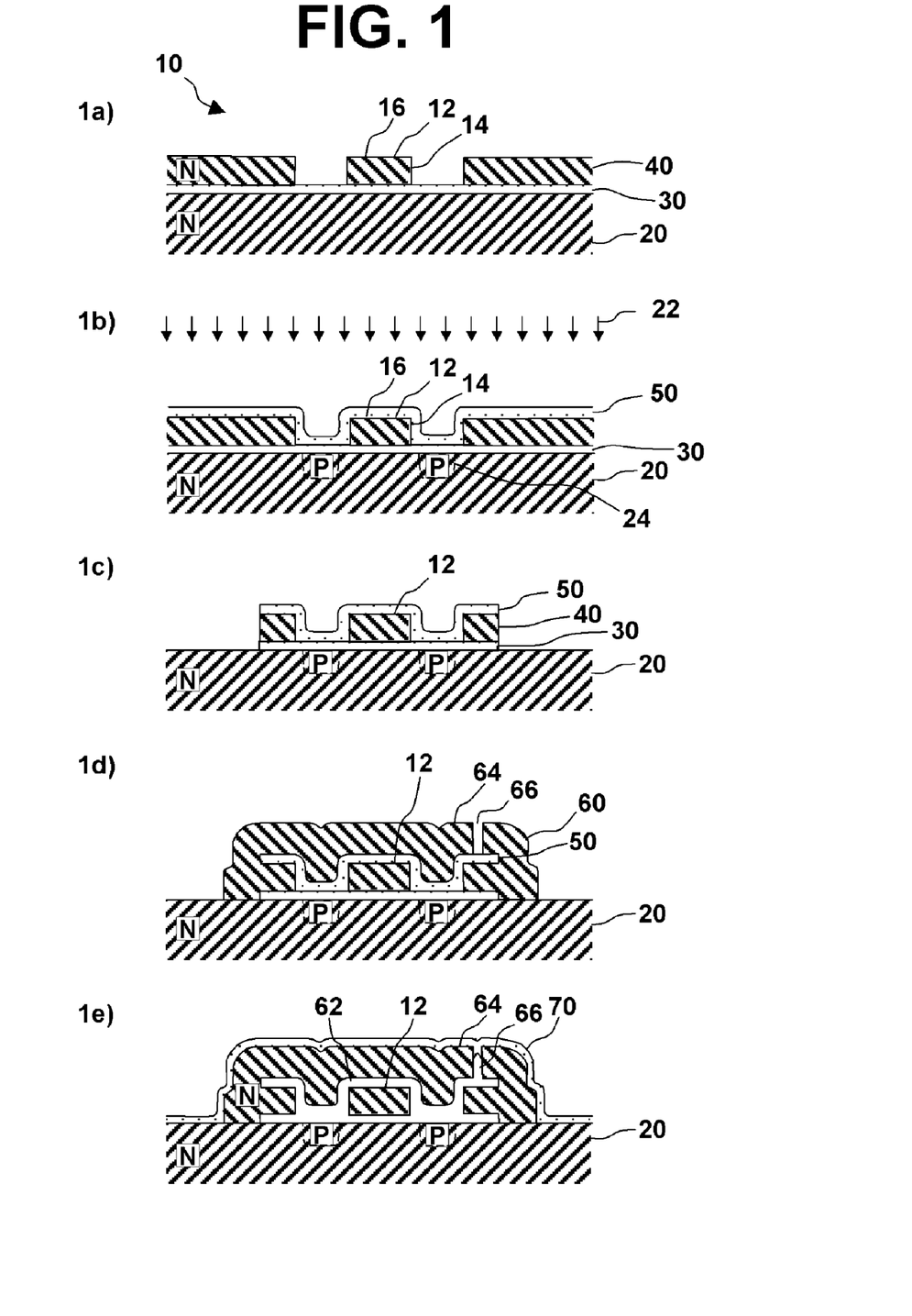
FIG. 1 illustrates a process for fabricating an optically coupled resonator, in accordance with one embodiment of the current invention.

FIG. 1 illustrates a process for fabricating an optically coupled resonator, in accordance with one embodiment of the present invention. For the description of this figure and the figures that follow, similarly numbered objects correspond to similar elements. Optically coupled resonator 10 is fabricated on semiconductor substrate 20 such as an n-type single-crystal silicon wafer, a silicon-on-insulator wafer, a handle wafer of a silicon-on-insulator wafer, or another suitable substrate. As illustrated in FIG. 1a, lower sacrificial layer 30 is formed on semiconductor substrate 20 and comprises a thermally grown layer of silicon dioxide also referred to as thermally grown oxide, a deposited layer of silicon dioxide also referred to as a deposited oxide, a buried oxide layer of a silicon-on-insulator (SOI) wafer, or a layer of another suitable sacrificial material. The deposited oxide may be doped while being deposited, or the oxide may be deposited as a laminate or multi-layer film. The thickness of lower sacrificial layer 30 is selected, in part, to allow resonator 10 to move without striking or sticking to semiconductor substrate 20 after sacrificial layer 30 is sacrificially etched and removed as described below.

Structural layer 40 such as amorphous silicon, polycrystalline silicon, epi-poly, epitaxial silicon, single-crystal silicon, or a combination thereof is deposited or otherwise formed on lower sacrificial layer 30. For example, structural layer 40 may comprise the active silicon layer of an SOI wafer, formed in one embodiment by bonding a second silicon wafer to an oxidized semiconductor substrate 20, and grinding and polishing the bonded wafer to the desired thickness, as is known in the art. Structural layer 40 may be deposited or otherwise formed in a substantially undoped or doped condition. Additional dopant may be added, such as with ion implantation or a dopant.diffusion process, to dope structural layer 40. In the process flow illustrated, semiconductor substrate 20 and structural layer 40 are doped n-type, although p-type dopants may be used for either. Structural layer 40 is deposited or otherwise formed to a desired thickness of resonator 10 between a few tenths of micrometers to a few micrometers or more. Structural layer 40 is patterned and etched to form resonator body 12 having resonator sidewall 14 and resonator upper surface 16 using, for example, photoresist, photolithography, and wet or dry etching techniques as are used in the semiconductor processing industry.

As illustrated in FIG. 1b, upper sacrificial layer 50 is formed on at least resonator sidewall 14 and resonator upper surface 16. Similar to lower sacrificial layer 30, upper sacrificial layer 50 may comprise a thermally grown oxide, a deposited oxide, a doped oxide such as a borosilicate glass, a phosphosilicate glass, a borophosphosilicate glass, or other suitable sacrificial material. The thickness of upper sacrificial layer 50 is selected, in part, to allow resonator 10 to move after upper sacrificial layer 50 is sacrificially etched and removed as described below.

To form laterally offset photodiode 24, semiconductor substrate 20 is locally implanted or otherwise doped with implant species 22 such as a p-type dopant (as shown) or an n-type dopant. In one embodiment, resonator body 12 and portions of upper sacrificial layer 50 deposited on resonator sidewall 14 locally mask the implanting. Use of resonator body 12 as an implant mask allows laterally offset photodiode 24 to be located in close proximity to resonator 10, positioned laterally off to the side and in a different plane than resonator body 12. Upper sacrificial layer 50 deposited on resonator sidewall 14 allows finer control of the position of laterally offset photodiode 24 in semiconductor substrate 20.

As illustrated in FIG. 1c, a portion of semiconductor substrate 20 near resonator body 12 is exposed. Portions of upper sacrificial layer 50, structural layer 40, and lower sacrificial layer 30 are patterned and etched to expose semiconductor substrate 20 in desired regions. Optionally, exposed portions of semiconductor substrate 20 may be implanted, such as with an n-type dopant (as shown) or a p-type dopant.

As illustrated in FIG. 1d, shell layer 60 is deposited or otherwise formed on upper sacrificial layer 50 and exposed portions of semiconductor substrate 20 to form resonator shell 64 around resonator body 12. Resonator shell 64 is formed around resonator body 12, for example, by depositing shell layer 60 on at least resonator body 12 and exposed portions of semiconductor substrate 20, and patterning and etching shell layer 60 to form resonator shell 64 around resonator body 12 with shell layer 60 attached to semiconductor substrate 20. In the example shown, Vertical etch channels 66 are formed when resonator shell 64 is patterned and etched. Shell layer 60 such as amorphous silicon, polycrystalline silicon, epi-poly, epitaxial silicon, single-crystal silicon, or a combination thereof may be doped during deposition or subsequent to deposition. The thickness of shell layer 60 is selected, in part, to provide protection for resonator 10 and to allow vibrations of resonator 10 in vacuum without significant distortion of resonator shell 64. Shell layer 60 may be doped or undoped.

As illustrated in FIG. 1e, lower sacrificial layer 30 and upper sacrificial layer 50 are sacrificially etched to form resonator cavity 62 between resonator shell 64 and resonator body 12, and between resonator body 12 and semiconductor substrate 20. Lower sacrificial layer 30 and upper sacrificial layer 50 may be etched through one or more vertical or horizontal etch channels 66 in resonator shell 64 or between resonator shell 64 and semiconductor substrate 20 to form resonator cavity 62 using, for example, a liquid sacrificial etchant such as hydrofluoric acid.

To seal resonator cavity 62 in a vacuum or at another predetermined level such as atmospheric pressure, sealing layer 70 is applied over resonator shell 64 to seal etch channels 66. For example, resonator cavity 62 is sealed with sealing layer 70 when etch channels 66 used to etch and form resonator cavity 62 are filled, capped off, or otherwise plugged. Sealing layer 70 includes a material such as amorphous silicon, polysilicon, epi-poly, epitaxial silicon, silicon dioxide, silicon nitride, aluminum, gold, chromium, copper, nickel, palladium, tungsten, titanium, platinum, photoresist, an insulating film, a semiconducting film, a metal film, a metal alloy, a polymeric film, or a combination thereof. Sealing layer 70 may be deposited under vacuum conditions such as existing in a sputtering process, a low-pressure plasma deposition process or a low-pressure chemical vapor deposition process to obtain the desired vacuum level and to seal off resonator cavity 62.

Variations in the order and sequence of process steps and unit processes that are used may be varied from those detailed above, such as the exchange of p-type dopants for n-type dopants and vice-versa, adjustments to the dopant species, and modifications to the dopant concentrations. Other substrates may be used such as silicon carbide substrates and insulative substrates. Other materials such as silicon carbide may also be used for the resonator. The substrates may be augmented with additional epitaxial layers and deposited thin films, other mechanical structures such as pressure-sensitive diaphragms, active electronic devices such as transistors, integrated circuits and optoelectronic devices, and optical waveguides without loss of generality in the described processing. Other masking materials than photoresist may be used for patterning and etching the desired features. Other processing steps such as annealing or driving an implanted dopant are not detailed herein for brevity. Additional masking steps and unit processes (not shown) may be used to form, for example, one or more photodiodes around or under resonator body 12, or to form other structures and features. The relative dimensions of the resonator, shell, gaps and substrate may also be varied from those shown. Although a resonator attached to the substrate at one or both ends is implied by the illustrations, other variations of resonator designs such as those of balanced resonators or multiple resonators or combinations of cantilevered and doubly supported resonators may be equally incorporated. The laterally offset photodiode, although shown in close proximity to resonator body 12, may be positioned further away from resonator 10 and be electrically connected to a laterally offset electrode that is proximate to resonator body 12. In one example, the photodiode may be positioned in resonator shell 64. In some cases, resonator shell 64 may be omitted from resonator 10.

Figure 2:
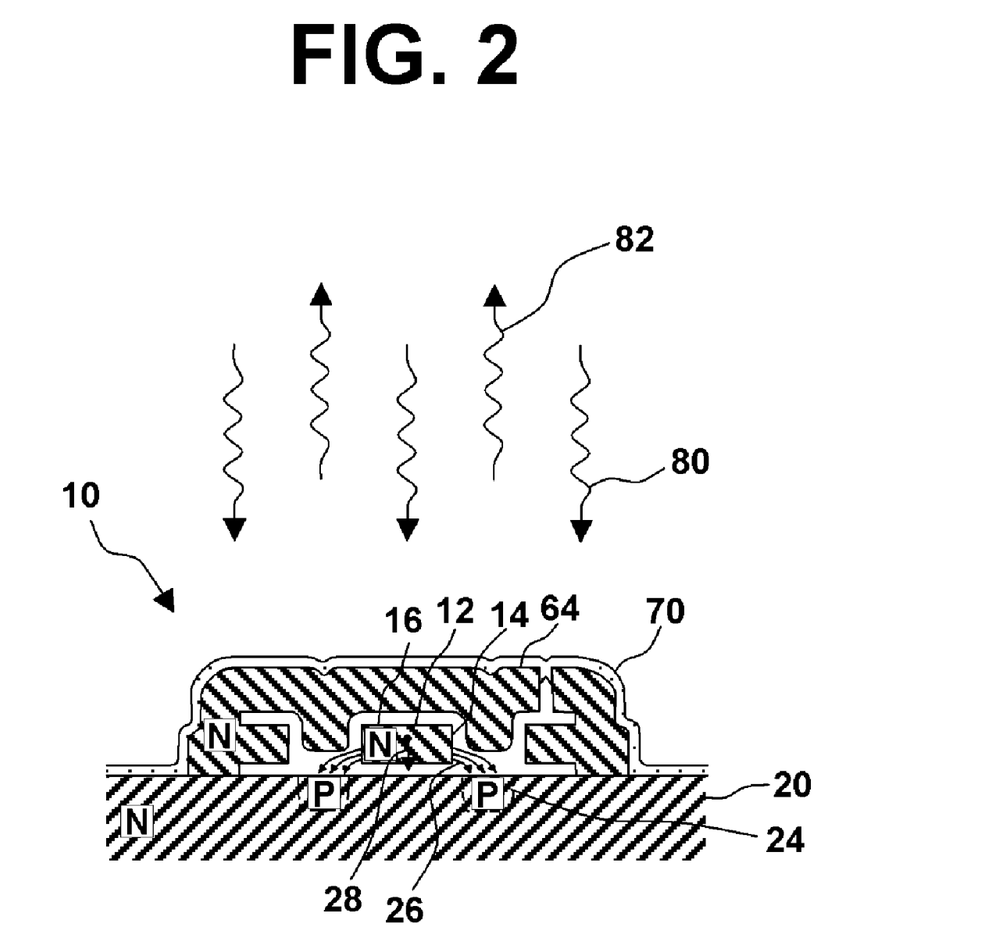
FIG. 2 is a cross-sectional view of an optically coupled sealed-cavity resonator, in accordance with one embodiment of the current invention.

FIG. 2 shows a cross-sectional view of an optically coupled sealed-cavity resonator, in accordance with one embodiment of the present invention. Optically coupled resonator 10 includes resonator body 12 with resonator sidewalls 14 and laterally offset photodiode 24 adjacent to resonator 10. Laterally offset photodiode 24, in one example, is formed in semiconductor substrate 20 adjacent to resonator 10 by implanting semiconductor substrate 20 while using resonator body 12 of resonator 10 to locally mask the implanting.

To optically excite resonator 10 and to determine one or more resonant frequencies of resonator 10, electric field 26 is generated between laterally offset photodiode 24 and resonator body 12 of resonator 10 when incident light 80 strikes photodiode 24. One side of laterally offset photodiode 24 is electrically connected to resonator body 12, and electric field 26 results when a photovoltage is generated from incident light 80 striking photodiode 24. Electric field 26 or a component thereof provides driving force 28 to excite and actuate resonator 10.

Vibrations or displacements of resonator 10 may be sensed, for example, with reflected light 82 that is reflected from at least one surface of resonator 10 such as resonator upper surface 16. Incident light 80 partially transmits through resonator shell 64 to allow reflections of incident light 80 from upper surface 16 of resonator body 12. Reflected light 82 is intensity modulated in correspondence with vibrations or displacements of resonator body 12 within resonator shell 64. Portions of incident light 80 may reflect one or more times in the gap between resonator shell 64 and resonator body 12 before being transmitted back through resonator shell 64 or continuing towards semiconductor substrate 20. Similarly, portions of incident light 80 may reflect one or more times in the gap between resonator body 12 and semiconductor substrate 20 before being transmitted back through resonator body 12 and resonator shell 64 or into semiconductor substrate 20. Similarly, portions of incident light 80 may reflect one or more times between surfaces of sealing layer 70, surfaces of resonator shell 64, or between surfaces of resonator body 12. Each reflection of incident light 80 may constructively or destructively interfere with other reflection portions of incident light 80 to enhance or diminish the intensity of reflected light 82. The absorption of incident light 80 in sealing layer 70, resonator shell 64, resonator body 12 or semiconductor substrate 20 reduces the intensity of reflected light 82, and the wavelengths of incident light 80 are chosen to allow suitable transmission of incident light 80 and reflected light 82.

Optically coupled resonator 10 and laterally offset photodiode 24 adjacent to resonator body 12 of resonator 10 may be may be included in devices such as a strain sensor, a pressure sensor, an accelerometer, an angular rate sensor, a temperature sensor, a chemical sensor, a biological sensor, an explosives detector, a radiation detector, a radio-frequency filter, a voltage-controlled oscillator, a mechanical oscillator, or a resonant device.

Although incident light 80 and reflected light 82 are shown as perpendicular to resonator shell 64 and in line with resonator body 12, it will be appreciated that other design variations exist, such as the use of angled incident and angled reflected light, or the use of light impinging from below through a suitably transmissive substrate. Incident light 80 may be comprised of a single wavelength of light or of multiple wavelengths of light, and may cover a narrow or broad range of wavelengths. In one example, incident light 80 of a single wavelength is partially reflected from a surface of resonator body 12. In another example, incident light 80 comprises two wavelengths from two light sources, one of which is used to generate the photovoltage while the other is used to determine vibrations or displacements of resonator body 12. In an alternative configuration, vibrations or displacements of resonator body 12 are detected with a second laterally offset photodiode, and the resulting electrical signal is processed by on-chip or off-chip electronics. In another alternative configuration, laterally offset photodiode 24 is configured in a self-resonant mode wherein lateral displacements of resonator body 12 diminish the intensity of incident light 80 striking the photodiode, which in turn reduce driving force 28 and allow resonator 10 to return towards an equilibrium position. The driving cycle is then repeated.

Figure 3:
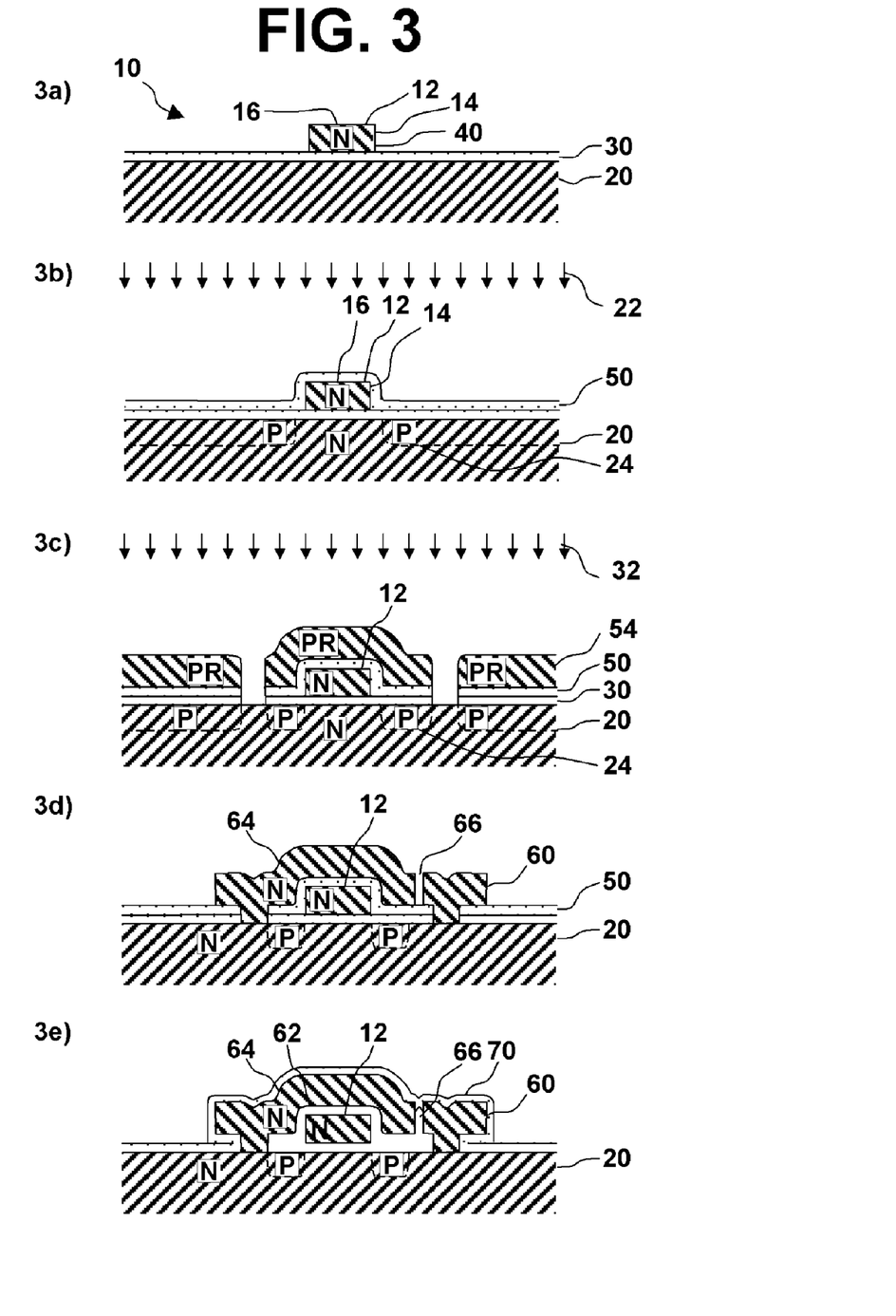
FIG. 3 illustrates a process for fabricating an optically coupled resonator, in accordance with another embodiment of the current invention.

FIG. 3 illustrates a process for fabricating an optically coupled resonator, in accordance with another embodiment of the present invention. Optically coupled resonator 10 is fabricated on semiconductor substrate 20 such as a single-crystal silicon wafer or a silicon-on-insulator wafer. As illustrated in FIG. 3a, lower sacrificial layer 30 such as a thermally grown oxide or a deposited oxide is formed on semiconductor substrate 20. Structural layer 40 such as amorphous silicon, polycrystalline silicon, epi-poly, epitaxial silicon, single-crystal silicon, or a combination thereof is deposited or otherwise formed on lower sacrificial layer 30. Structural layer 40 may be deposited in an undoped or doped condition. Additional dopant may be added to structural layer 40 after deposition, such as with ion implantation or a dopant.diffusion process. Structural layer 40 is patterned and etched to form resonator body 12 having resonator sidewall 14 and resonator upper surface 16 using, for example, a suitable photomask and photoresist process.

As illustrated in FIG. 3b, upper sacrificial layer 50 such as a thermally grown oxide or a deposited oxide is deposited on at least resonator sidewall 14 and resonator upper surface 16. Semiconductor substrate 20 is implanted with a p-type dopant 22 to form laterally offset photodiode 24, using resonator body 12 and upper sacrificial layer 50 deposited on resonator sidewall 14 to locally mask the implanting.

As illustrated in FIG. 3c, portions of upper sacrificial layer 50 and lower sacrificial layer 30 are patterned and etched by using patterned photoresist 54 to expose a portion of semiconductor substrate 20 near resonator body 12. The exposed portion of semiconductor substrate 20 may be implanted with an n-type dopant 32 to junction isolate laterally offset photodiodes 24.

As illustrated in FIG. 3d, shell layer 60 such as amorphous silicon, polycrystalline silicon, epi-poly, epitaxial silicon, single-crystal silicon, or a combination thereof is deposited or otherwise formed on upper sacrificial layer 50 above resonator body 12 and exposed portions of semiconductor substrate 20. Shell layer 60 may be doped during or after deposition. Shell layer 60 is patterned and etched to form resonator shell 64 around resonator body 12. Vertical etch channels 66 may also be formed when shell layer 60 is patterned and etched.

As illustrated in FIG. 3e, a portion or more of lower sacrificial layer 30 and upper sacrificial layer 50 are etched and selectively removed to form resonator cavity 62 between resonator shell 64 and resonator body 12 and between resonator body 12 and semiconductor substrate 20. Lower sacrificial layer 30 and upper sacrificial layer 50 may be etched through one or more vertical or horizontal etch channels 66 in resonator shell 64 or between resonator shell 64 and semiconductor substrate 20 to form resonator cavity 62.

To seal resonator cavity 62, sealing layer 70 is applied to fill, cap off, or otherwise plug one or more etch channels 66. Suitable materials for sealing layer 70 include a material such as polysilicon, epi-poly, epitaxial silicon, silicon dioxide, silicon nitride, aluminum, gold, chromium, copper, nickel, palladium, tungsten, titanium, platinum, photoresist, an insulating film, a semiconducting film, a metal film, a metal alloy, a polymeric film, or a combination thereof. During the sealing process, a vacuum or other predetermined pressure may be obtained and retained in resonator cavity 62 after etch channels 66 are sealed.

Figure 4:
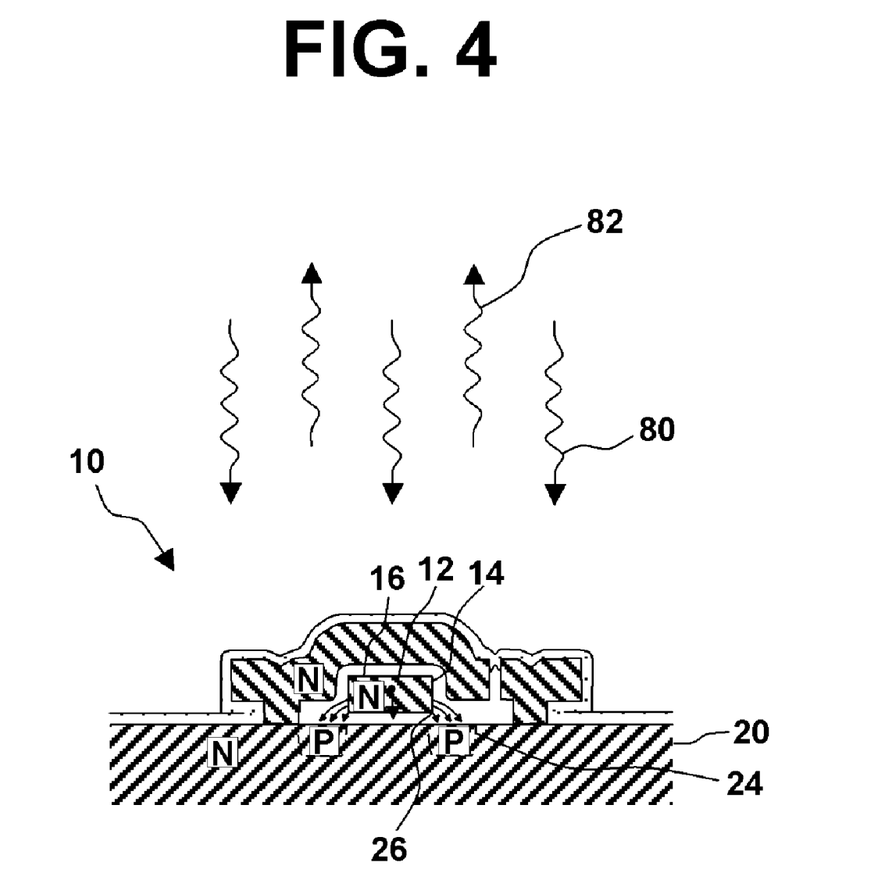
FIG. 4 is a cross-sectional view of an optically coupled sealed-cavity resonator, in accordance with another embodiment of the current invention.

FIG. 4 is a cross-sectional view of an optically coupled sealed-cavity resonator, in accordance with another embodiment of the present invention. Optically coupled resonator 10 includes resonator body 12 with one or more resonator sidewalls 14. Laterally offset photodiode 24 in semiconductor substrate 20 adjacent to resonator 10 is formed, for example, by implanting semiconductor substrate 20 with resonator 10 locally masking the implanting.

Resonator 10 is driven by electric field 26 or a driving component thereof that is generated between laterally offset photodiode 24 and resonator body 12 of resonator 10 when incident light 80 strikes photodiode 24. Vibrations or displacements of resonator 10 may be sensed with reflected light 82 that is reflected from a surface of resonator body 12 such as resonator upper surface 16.

Figure 5:
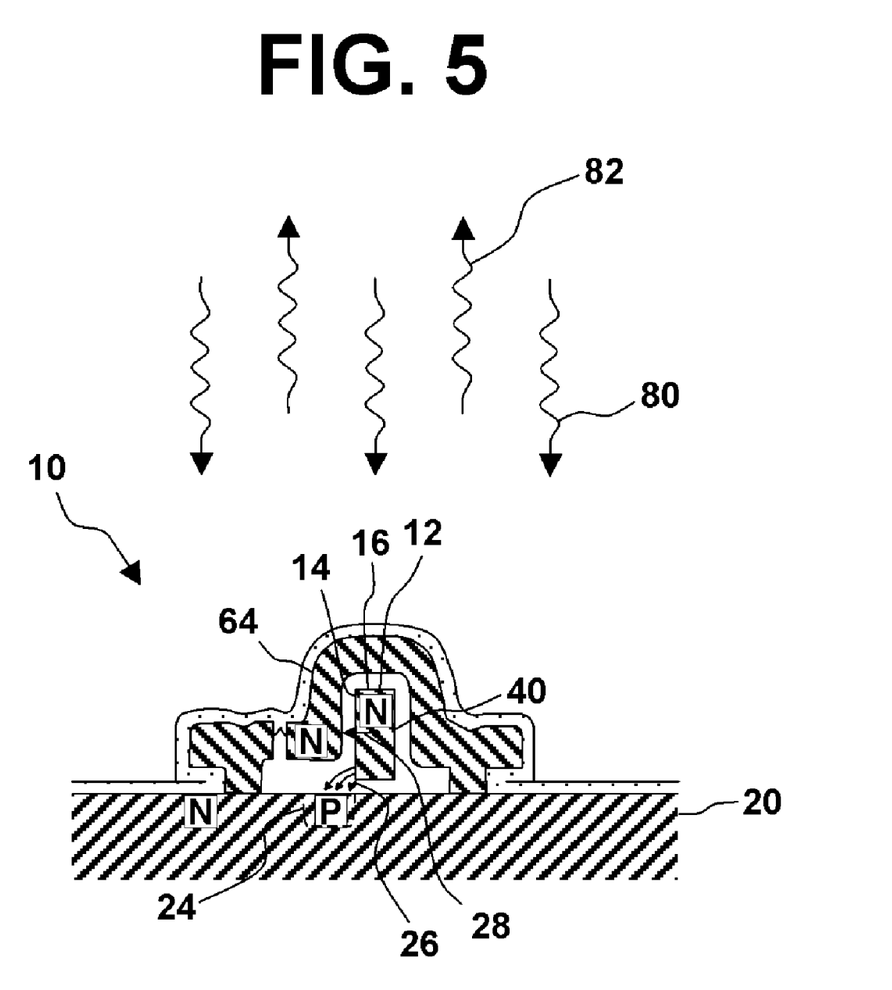
FIG. 5 is a cross-sectional view of an optically coupled sealed-cavity resonator, in accordance with another embodiment of the current invention.

FIG. 5 shows a cross-sectional view of an optically coupled sealed-cavity resonator, in accordance with another embodiment of the present invention. Optically coupled resonator 10, including resonator body 12 with resonator sidewalls 14, vibrates in a plane parallel to a surface of semiconductor substrate 20. Laterally offset photodiode 24, which is formed in semiconductor substrate 20 adjacent to resonator 10, allows resonator 10 to be driven with incident light 80 that strikes laterally offset photodiode 24. Laterally offset photodiode 24 may be formed, for example, by implanting semiconductor substrate 20 with resonator 10 locally masking the implanting, or by locally implanting semiconductor substrate 20 after or prior to forming structural layer 40. Electric field 26 is generated between laterally offset photodiode 24 and resonator body 12 of resonator 10 when incident light 80 strikes photodiode 24. Electric field 26 or a driving component thereof provides driving force 28 for driving resonator 10, and selective modulation of incident light 80 allows resonator 10 to be driven at or near a resonant frequency of resonator 10. Vibrational modes and frequencies of resonator 10 are determined in part by the cross-sectional dimensions and end conditions of resonator body 12, end conditions such as whether resonator body 12 is attached at one or both ends (not shown).

Vibrations or displacements of resonator 10 may be sensed with reflected light 82 reflected from resonator upper surface 16 of resonator 10 or from variations in the gap between resonator sidewalls 14 and resonator shell 64. Reflected light 82 may be used to determine one or more resonant frequencies of resonator 10. Analysis of the detected resonant frequencies allows determination of an applied stimulus such as mechanical strain that is exerted on resonator body 12 by a suitable microstructure, microstructures such as a pressure-sensing diaphragm, a flexure of an accelerometer, or a bending of the substrate attached thereto.

Figure 6:
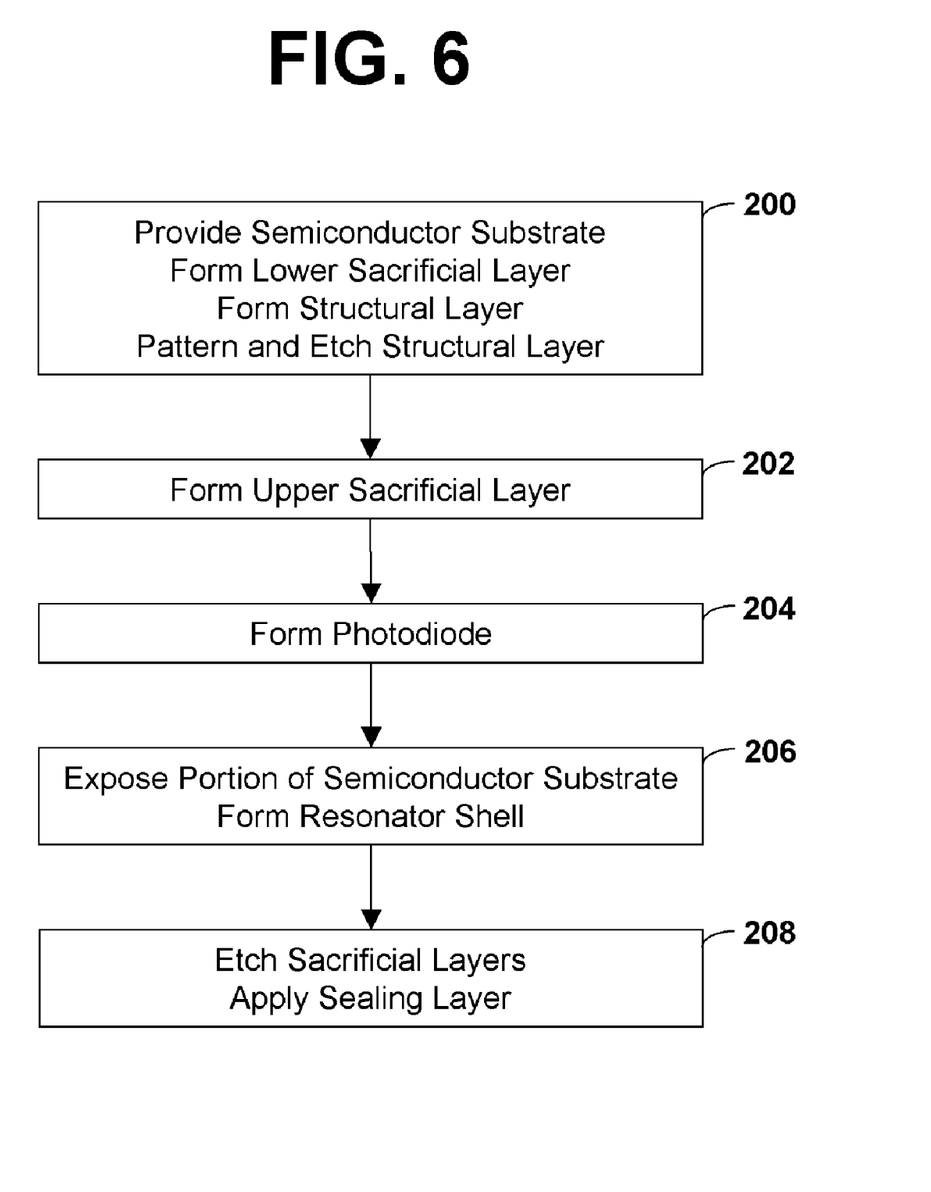
FIG. 6 is a flow diagram of a process for fabricating an optically coupled resonator, in accordance with another embodiment of the current invention.

FIG. 6 is a flow diagram of a process for fabricating an optically coupled resonator, in accordance with another embodiment of the present invention.

A semiconductor substrate is provided, as seen at block 200. The semiconductor substrate includes, for example, a single-crystal silicon wafer, a silicon-on-insulator wafer, a handle wafer of a silicon-on-insulator wafer, or other suitable substrate such as a silicon carbide wafer. A lower sacrificial layer such as a thermally grown oxide, a deposited oxide, a doped oxide, or a combination thereof is formed on the semiconductor substrate. A structural layer such as amorphous silicon, polycrystalline silicon, epi-poly, epitaxial silicon, single-crystal silicon, or a combination thereof is deposited or otherwise formed on the lower sacrificial layer. The structural layer may be doped. The structural layer is patterned and etched using, for example, conventional semiconductor processing techniques to a form resonator body having resonator sidewalls and a resonator upper surface.

An upper sacrificial layer is formed on the resonator sidewall and the resonator upper surface, as seen at block 202. The upper sacrificial layer such as a thermally grown oxide, a deposited oxide, a doped oxide, or a combination thereof is deposited or otherwise formed on at least the resonator sidewalls and the resonator upper surface.

A laterally offset photodiode is formed, as seen at block 204. In one example, the semiconductor substrate is implanted to form a laterally offset photodiode in the substrate prior to forming the lower sacrificial layer. In another example, the photodiode is formed prior to forming the structural layer. In another example, the photodiode is formed prior to depositing or otherwise forming the upper sacrificial layer. In another example, the photodiode is formed by ion implantation through the upper sacrificial layer after the upper sacrificial layer is deposited or otherwise formed. In another example, the resonator body and the upper sacrificial layer deposited on the resonator sidewall locally mask the implanting in a self-aligned configuration. In another example, the photodiode is formed after the upper sacrificial layer is patterned and etched. In another example, the photodiode is formed after portions of the semiconductor substrate are exposed.

A portion of the semiconductor substrate near the resonator body is exposed, as seen at block 206. In one example, one or more portions of the semiconductor substrate are exposed when one or more portions of the upper sacrificial layer, the structural layer, and the lower sacrificial layer near the resonator body are patterned and etched. In another example, one or more portions of the semiconductor substrate are exposed when one or more portions of the upper sacrificial layer and the lower sacrificial layer are patterned and etched. The exposed portions of the semiconductor substrate may then be implanted or otherwise doped.

To cover the resonator, a resonator shell is formed around the sidewalls and upper surface of the resonator body. In one example, the resonator shell around the resonator body is formed by depositing a shell layer on at least a portion of the resonator body and the exposed portion of the semiconductor substrate, and then patterning and etching the shell layer. The shell layer may be doped during or after deposition.

A portion or more of the sacrificial layers are etched, as seen at block 208. As the sacrificial layers are removed, a resonator cavity is formed between the resonator shell and the resonator body and between the resonator body and the semiconductor substrate. The lower sacrificial layer and upper sacrificial layer are etched, for example, through one or more etch channels in or under the resonator shell to form the resonator cavity.

A sealing layer is deposited or otherwise applied to seal the resonator cavity by plugging the etch channels. The sealing layer may include a material such as amorphous silicon, polysilicon, epi-poly, epitaxial silicon, silicon dioxide, silicon nitride, aluminum, gold, chromium, copper, nickel, palladium, tungsten, titanium, platinum, photoresist, an insulating film, a semiconducting film, a metal film, a metal alloy, a polymeric film, or a combination thereof.

In another embodiment of the invention, a laterally offset photodiode is formed for an optically coupled resonator by implanting the semiconductor substrate to form one or more laterally offset photodiodes adjacent to the resonator. The resonator masks the implanting underneath the resonator when the semiconductor substrate is implanted.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. A process for fabricating an optically coupled resonator, the process comprising:
  providing a semiconductor substrate;
  forming a lower sacrificial layer on the semiconductor substrate;
  forming a structural layer on the lower sacrificial layer;
  patterning and etching the structural layer to form a resonator body, the resonator body having a resonator sidewall and a resonator upper surface;
  forming an upper sacrificial layer on at least the resonator sidewall and the resonator upper surface;

doping the semiconductor substrate to form a laterally offset photodiode;

exposing a portion of the semiconductor substrate near the resonator body;

forming a resonator shell around the resonator body;

etching at least a portion of the lower sacrificial layer and the upper sacrificial layer to form a resonator cavity around the resonator body; and applying a sealing layer to seal the resonator cavity.

2. The process of claim 1, wherein the semiconductor substrate comprises one of a single-crystal silicon wafer, a silicon-on-insulator wafer, or a handle wafer of a silicon-on-insulator wafer.

3. The process of claim 1, wherein the lower sacrificial layer comprises one of a thermally grown oxide, a deposited oxide, a doped oxide, or a combination thereof.

4. The process of claim 1, wherein the structural layer comprises one of amorphous silicon, polycrystalline silicon, epi-poly, epitaxial silicon, or single-crystal silicon.

5. The process of claim 1, wherein the structural layer is doped.

6. The process of claim 1, wherein the upper sacrificial layer comprises one of a thermally grown oxide, a deposited oxide, a doped oxide, or a combination thereof.

7. The process of claim 1, wherein exposing the portion of the semiconductor substrate near the resonator body comprises patterning and etching a portion of the upper sacrificial layer, the structural layer, and the lower sacrificial layer to expose the portion of the semiconductor substrate.

8. The process of claim 1, wherein exposing the portion of the semiconductor substrate near the resonator body comprises patterning and etching a portion of the upper sacrificial layer and the lower sacrificial layer to expose the portion of the semiconductor substrate.

9. The process of claim 8, wherein the exposed portion of the semiconductor substrate is implanted.

10. The process of claim 1, wherein forming the resonator shell around the resonator body comprises depositing a shell layer on at least the resonator body and the exposed portion of the semiconductor substrate, and patterning and etching the shell layer to form the resonator shell around the resonator body.

11. The process of claim 10, wherein the shell layer is doped.

12. The process of claim 1, wherein the lower sacrificial layer and the upper sacrificial layer are etched through at least one etch channel in the resonator shell or between the resonator shell and the semiconductor substrate to form the resonator cavity.

13. The process of claim 1, wherein the sealing layer comprises a material selected from the group consisting of amorphous silicon, polysilicon, epi-poly, epitaxial silicon, silicon dioxide, silicon nitride, aluminum, gold, chromium, copper, nickel, palladium, tungsten, titanium, platinum, photoresist, an insulating film, a semiconducting film, a metal film, a metal alloy, a polymeric film, and a combination thereof.

14. The process of claim 1, wherein the resonator cavity is sealed with the sealing layer when at least one etch channel used to etch the resonator cavity is plugged.

15. A process to form a laterally offset photodiode for an optically coupled resonator, the process comprising:

implanting a semiconductor substrate to form the laterally offset photodiode adjacent to the resonator, wherein the resonator masks the implanting underneath the resonator when the semiconductor substrate is implanted.

* * * * *